(12) United States Patent
McLundie et al.

(10) Patent No.: US 10,369,959 B2
(45) Date of Patent: Aug. 6, 2019

(54) BONNET DISPLACEMENT MECHANISM

(71) Applicant: Jaguar Land Rover Limited, Whitley, Coventry, Warwickshire (GB)

(72) Inventors: William McLundie, Bromsgrove (GB); Sudhindra Katagade, Coventry (GB); Syed Kazmi, Banbury (GB); Sivaprasad Mohankumar, Coventry (GB); John Perry, Teleford (GB); Andrew Profitt, Coventry (GB); Grenville Bateman, Coventry (GB)

(73) Assignee: Jaguar Land Rober Limited, Whitley, Coventry (GB)

( * ) Notice: Subject to any disclaimer, the term of this patent is extended or adjusted under 35 U.S.C. 154(b) by 93 days.

(21) Appl. No.: 15/508,856

(22) PCT Filed: Sep. 4, 2015

(86) PCT No.: PCT/EP2015/070294
§ 371 (c)(1),
(2) Date: Mar. 3, 2017

(87) PCT Pub. No.: WO2016/034725
PCT Pub. Date: Mar. 10, 2016

(65) Prior Publication Data
US 2017/0259776 A1    Sep. 14, 2017

(30) Foreign Application Priority Data

Sep. 5, 2014 (GB) .................................. 1415721.8
Sep. 5, 2014 (GB) .................................. 1415723.4

(51) Int. Cl.
*B60R 21/38* (2011.01)
*B62D 25/12* (2006.01)

(52) U.S. Cl.
CPC .............. *B60R 21/38* (2013.01); *B62D 25/12* (2013.01)

(58) Field of Classification Search
CPC ................................ B60R 21/38; B62D 25/12
See application file for complete search history.

(56) References Cited

U.S. PATENT DOCUMENTS 6,414,882 B1 *  7/2002  Butler .................... G11C 5/145
                                                           327/536
7,506,716 B1 *  3/2009  Salmon ................... B60R 21/38
                                                           180/274

(Continued)

FOREIGN PATENT DOCUMENTS

DE    102010023976 A1    2/2011
DE    102009040413 A1    3/2011

(Continued)

OTHER PUBLICATIONS

International Search Report for International application No. PCT/EP2015/070294, dated Jan. 12, 2015, 3 pages.

(Continued)

*Primary Examiner* — Darlene P Condra
(74) *Attorney, Agent, or Firm* — Reising Ethington P.C.

(57) ABSTRACT

A bonnet displacement mechanism for coupling a bonnet panel to a body structure of a vehicle. The bonnet displacement mechanism comprises a hinge mechanism for elevating a rear edge of the bonnet panel from a normal position, in-use, to a deployed position, and for lowering the rear edge of the bonnet panel from the deployed position to a latched position. The bonnet displacement mechanism comprises a latch mechanism to latch the hinge mechanism at the latched position.

19 Claims, 6 Drawing Sheets

(56) References Cited

U.S. PATENT DOCUMENTS

| | | | |
|---|---|---|---|
| 8,534,410 B2* | 9/2013 | Nakaura | B60R 21/38 |
| | | | 180/274 |
| 9,855,916 B2* | 1/2018 | Hwang | E05D 11/00 |
| 10,100,565 B2* | 10/2018 | Waskie | B62D 25/12 |
| 2005/0151393 A1 | 7/2005 | Borg et al. | |
| 2005/0279550 A1* | 12/2005 | Saville | B60R 21/38 |
| | | | 180/69.21 |
| 2006/0102402 A1* | 5/2006 | Birk | B60R 21/38 |
| | | | 180/89.17 |
| 2009/0266638 A1 | 10/2009 | Hayashi et al. | |
| 2016/0245003 A1* | 8/2016 | McIntyre | B60R 21/38 |
| 2016/0339963 A1* | 11/2016 | Inoue | B62D 25/12 |

FOREIGN PATENT DOCUMENTS

| | | |
|---|---|---|
| DE | 102009040415 A1 | 3/2011 |
| EP | 1749711 A2 | 2/2007 |
| EP | 2364887 A1 | 2/2011 |
| EP | 2777992 A1 | 9/2014 |
| GB | 2379481 A | 3/2003 |

OTHER PUBLICATIONS

Written Opinion for International application No. PCT/EP2015/070294, dated Jan. 12, 2015, 5 pages.
Combined Search and Examination Report for application No. GB1415721.8, dated Feb. 27, 2015, 10 pages.
Combined Search and Examination Report for application No. GB1515709.2, dated Sep. 21, 2015, 10 pages.
European Search Report corresponding to European application No. EP 18183295.7, dated Sep. 5, 2018, 6 pages.

\* cited by examiner

BONNET DISPLACEMENT MECHANISM

TECHNICAL FIELD

The invention relates to a bonnet displacement mechanism and more specifically to those mechanisms for elevating a rear edge of a bonnet panel in response to a specific frontal impact, namely a pedestrian impact.

BACKGROUND

A typical vehicle such as a car includes a bonnet panel forming a canopy covering the engine and other related components. The bonnet panel is coupled to a body structure of the car by means of a bonnet displacement mechanism, such as a hinge. In normal use the bonnet panel is in a normal position forming a canopy over the engine and other components during normal driving. If access to the component is required, a front edge of the bonnet panel can be elevated to incline the bonnet panel about the bonnet displacement mechanism.

Some vehicles may be fitted with a bonnet displacement mechanism which also allows a rear edge of the bonnet panel to be raised from the normal position to an elevated position. In this case, the bonnet panel is inclined in the reverse to the scenario described above. Raising the rear edge of the bonnet panel is desirable for situations such as an impact with a pedestrian. In this scenario, raising the rear edge of the bonnet panel so as to incline the bonnet panel in the reverse sense may be desirable to reduce the head impact experienced by the pedestrian.

Such a displacement mechanism is described in US 2007187993 A1.

It is an object of the present invention to further improve on the prior art.

SUMMARY OF THE INVENTION

Aspects of the invention are defined in the appended claims.

According to an aspect of the present invention there is provided a bonnet displacement mechanism for coupling a bonnet panel to a body structure of a vehicle, the bonnet displacement mechanism comprising; a hinge mechanism for elevating a rear edge of the bonnet panel from a normal position, in-use, to a deployed position, and for lowering the rear edge of the bonnet panel from the deployed position to a latched position; and a latch mechanism to latch the hinge mechanism at the latched position.

Latching the hinge mechanism after deployment makes it possible for the vehicle to continue with ordinary use after an impact and corresponding deployment of the bonnet panel since a user can merely press down at the rear edge of the bonnet panel. This is in contrast to the aforementioned prior art whereby after deployment of the bonnet panel, the vehicle would be recovered and towed to a repair facility, or service center to be repaired.

The latch mechanism may be arranged to latch the hinge mechanism at the latched position in response to moving the hinge mechanism from the deployed position to the normal position.

Such an arrangement provides an automatic latching mechanism since the hinge latches in response to moving the latch mechanism from the deployed position to the latched position as opposed to requiring an additional operation by a user to firstly move the hinge mechanism from the deployed to the normal position and then to latch the hinge mechanism at the latched position.

The bonnet displacement mechanism may comprise a stud and a complementary guide to control the elevating trajectory and the lowering trajectory of the bonnet panel.

Controlling the elevating and lowering trajectories of the bonnet panel controls the vector velocities in each axis of movement. Such control further minimizes head collision force experienced by a pedestrian.

The stud may be moveable relative to the bonnet panel and the guide is stationary relative to the bonnet panel.

The latch mechanism may comprise a catch and the stud may form a latch, the catch may be arranged to engaged and secure the latch at the latched position.

Using the stud as the latch removes the need for an additional component required for that purpose since the stud serves two functions.

The catch may comprise an arm having an interior edge defining an opening arranged to engage the stud at the latched position.

The arm may be resilient to allow passage of the stud from the normal position to the latched position.

A resilient arm is easy to manufacture and requires minimal maintenance after use since the arm is only a single component.

The bonnet displacement mechanism may include a hinge leaf for elevating and lowering a front edge of the bonnet panel to and from a normal position, in use, the bonnet displacement mechanism may comprise a flange for coupling the hinge leaf to the bonnet panel.

The guide may be provided on the flange and the stud is provided on the hinge leaf.

Providing the stud on the hinge leaf means that the trajectory of the hinge leaf is also controlled so as to directly constrain its movement.

The bonnet displacement mechanism may comprise a deformable member arranged to deform in response to moving the hinge mechanism from the normal position to the elevated position.

The deformable member provides a damper to damp out any oscillations caused by the sudden elevation of the rear edge of the bonnet to the deployed position. Minimizing these oscillations further minimizes the head impact force experienced by a pedestrian during a collision since such oscillations would change the local velocity vector of the bonnet panel. In particular, an upwards oscillation may increase the local velocity to undesirable levels.

The deformable member may be plastically deformable.

Plastic deformation as opposed to elastic deformation is desirable since elastic deformation may rebound the hinge leaf depending on the force applied to it. In doing so, the plastically deformable member minimizes the risk of any induced oscillations in to the bonnet panel.

The deformable member may be arranged to deform over the full travel of the bonnet panel from the normal position to the deployed position.

Deforming the deformable member of the full travel of the bonnet panel results in maximum damping as opposed to a case where the deformable member deforms only over part of the travel of the bonnet panel, for example, the end part of the travel.

The deformable member may be deformable in response to force exerted by the stud.

The deformable member being deformed by the force exerted by the stud means that the stud is used for more than one purpose. In this case, the stud is used at least for engaging the guide to control the elevation of the bonnet panel and in addition for exerting force to the deformable member. Accordingly, a separate component is not required in order to initiate the damping from the deformable member.

The deformable member may comprise a substantially U-shaped seat for receiving the stud.

The substantially U-shaped seat ensures that the stud positively engages the deformable member and reduces the risk of the stud slipping off or not engaging the deformable member at all.

The deformable member may comprise a strut coupled between the flange and the hinge leaf.

The strut provides an alternative method of damping.

The strut may have a shape selected from the list of substantially V-shaped, substantially diamond shaped, and substantially elongate.

The strut may include a weakened area arranged to fracture at a predetermined tensile load.

The weakened area provides additional control over how much damping is provided by the strut.

The position of the bonnet panel at the normal position may be different to the bonnet at the latched position.

In this way, the position of the bonnet panel after deployment will serve as a reminder to a user that the bonnet displacement mechanism requires replacement.

According to a further aspect of the present invention there is provided a bonnet displacement mechanism for coupling a bonnet panel to a body structure of a vehicle, comprising; a hinge mechanism for elevating a rear edge of the bonnet panel from a normal position, in-use, to a deployed position, the hinge mechanism comprising a stud moveable relative to the bonnet panel; and a deformable member coupled to the bonnet panel and comprising a substantially U-shaped seat arranged to engage the stud to deform in response to moving the bonnet panel from the normal position to the deployed position.

The deformable member provides a damper to damp out any oscillations caused by the sudden elevation of the rear edge of the bonnet to the deployed position. Minimizing these oscillations further minimizes the head impact force experienced by a pedestrian during a collision since such oscillations would change the local velocity vector of the bonnet panel. In particular, an upwards oscillation may increase the local velocity to undesirable levels. In addition, the substantially U-shaped seat ensures that the stud positively engages the deformable member and reduces the risk of the stud slipping off or not engaging the deformable member at all.

The deformable member may be plastically deformable.

Plastic deformation as opposed to elastic deformation is desirable since elastic deformation may rebound the hinge leaf depending on the force applied to it. In doing so, the plastically deformable member minimizes the risk of any induced oscillations in to the bonnet panel.

The deformable member may deform over the full travel of the bonnet panel from the normal position to the deployed position.

Deforming the deformable member of the full travel of the bonnet panel results in maximum damping as opposed to a case where the deformable member deforms only over part of the travel of the bonnet panel, for example, the end part of the travel.

The bonnet displacement mechanism may include a flange for coupling the bonnet panel to the bonnet displacement mechanism wherein the deformable member may be cantilevered from the flange and wherein the substantially U-shaped seat may be provided at the suspended end thereof.

A cantilevered arrangement is preferable to other attachment mechanisms since it is simple.

The deformable member may include a weakened area arranged to deform at a predetermined tensile load.

The weakened area provides additional control over how much damping is provided by the deformable member.

The weakened area may comprise a throat intermediate a point of cantilever from the flange and the substantially U-shaped seat, the throat may narrow relative to the point of cantilever.

A relatively narrow throat is a reliable and relatively simple way in which to control the strength of the weakened area as opposed to other measures such as provided fracture lines or material changes.

The throat may be straight at the normal position and may include an elbow at the deployed position.

Such an arrangement is advantageous since a maintenance personnel can immediately determine if the deformable member requires replacement from a visual inspection. This is preferable to a case where the deformable member may include an elbow at the normal position and an elbow of a different angle at the deployed position since a visual inspection may not immediately distinguish a deformed member from an un-deformed member.

According to a further aspect of the present invention there is provided a vehicle comprising the aforementioned bonnet displacement mechanism for coupling a bonnet panel to a body structure of the vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
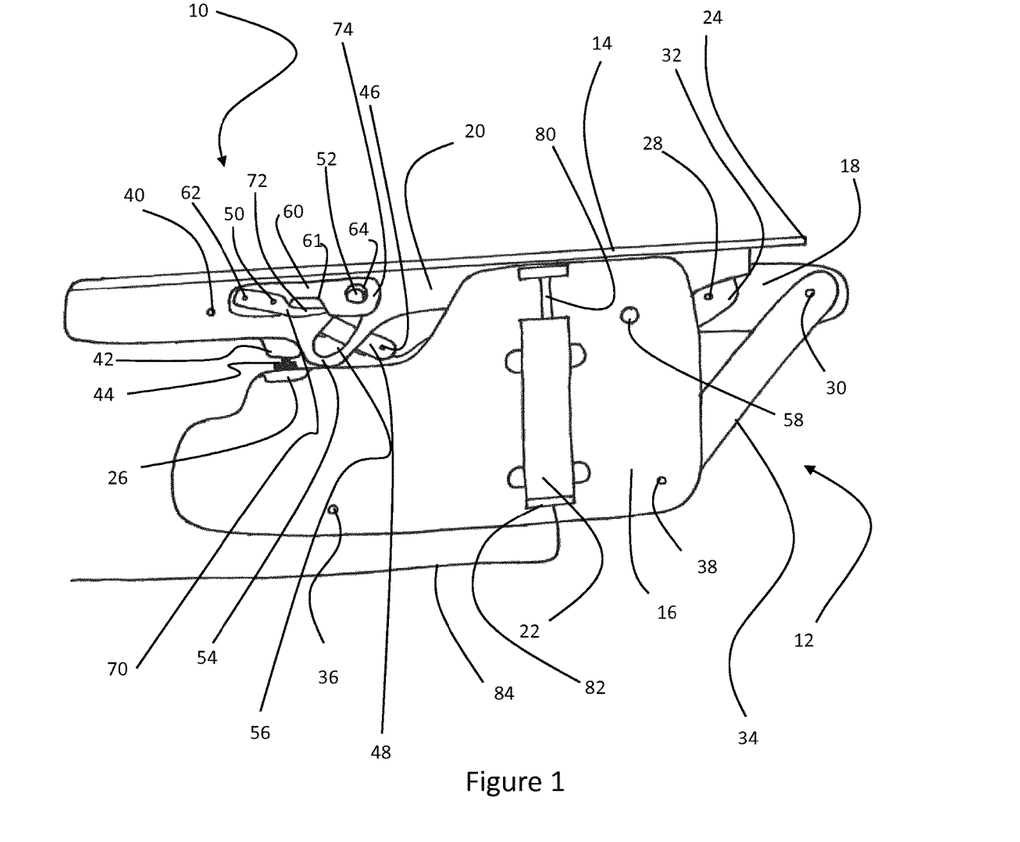
FIG. 1 shows a side view of a bonnet displacement mechanism according to the present invention, the mechanism being in a normal position.

With reference to FIG. 1 a bonnet assembly 10 includes a bonnet displacement mechanism 12 and a bonnet panel 14, the bonnet displacement mechanism 12 being located near the rear of the bonnet panel 14. The bonnet displacement mechanism 12 includes a mounting leaf 16, a hinge leaf 18, and a flange 20. The bonnet displacement mechanism also includes an actuator 22.

The bonnet panel 14 is a substantially planar panel and is known in the prior art. Only part of the bonnet panel 14 is shown in the Figures for brevity. In particular, a rear edge 24 of the bonnet panel 14 is shown whereas a front edge of the bonnet panel 14 is not. The function of the bonnet panel 14 is to provide a canopy to cover the engine and associated components in the front of the vehicle.

The mounting leaf 16 is a component pressed from a single sheet of metal. The mounting leaf 16 has various contours (not shown) in order to complement contours of a vehicle body structure so as to securely attach the bonnet displacement mechanism 12 to the body structure of the vehicle. The mounting leaf 16 has a platform 26 formed at the front end. The platform 26 is formed from a bent over portion of the metal sheet from which the mounting leaf 16 is made.

Figure 2:
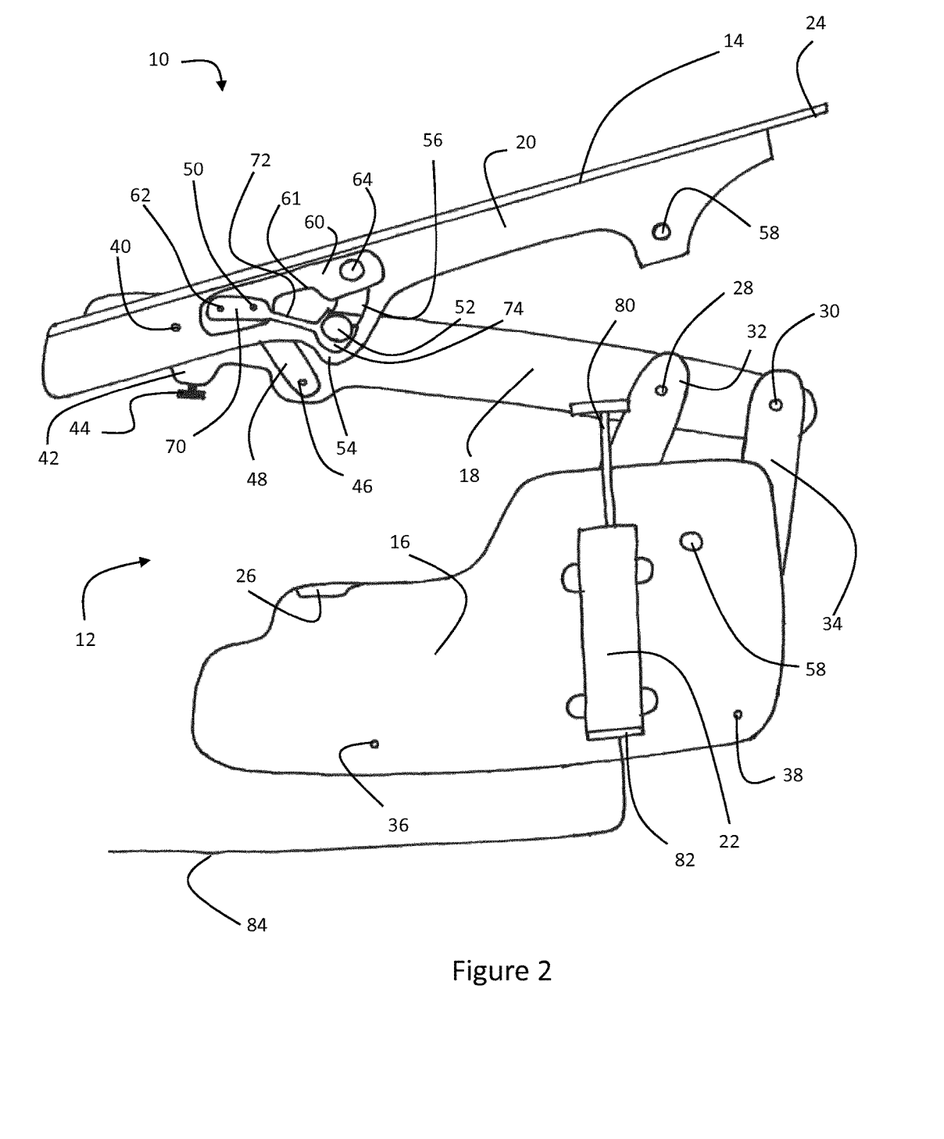
FIG. 2 shows the bonnet displacement mechanism from FIG. 1 in a deployed position.

With reference to FIGS. 1 and 2, the hinge leaf 18 is an elongate part formed from a single piece of metal. The rear edge of the hinge leaf 18 has two connection points 28, 30 separated by a relatively short distance. The connection points 28, 30 are in the form of pivot pins. These connection points 28, 30 are used to connect the hinge leaf 18 to the mounting leaf 16 by the front arm 32 and the rear arm 34 respectively. Although not shown, since it is covered by the mounting leaf 16, the front arm 32 is constructed from two beams which have a joint connection between them. The lower beam is connected to the mounting leaf 16 towards the forward end thereof. The rear arm 34 is connected to the mounting leaf 16 towards a rear end thereof. In this way, the mounting leaf 16 has a front coupling point 36 and a rear coupling point 38 on the mounting leaf 16. The separation distance between the front and rear coupling points 36, 38 is relatively large. The distance between the front and rear coupling points 36, 38 is greater than the distance between the front and rear connection points 28, 30. It is thus possible to incline the hinge leaf 18 relative to the mounting leaf 16 by virtue of the kinematic arrangement provided by the front arm 32 being jointed, the rear arm 34 being a single beam and the connection points 28 and 30 having a smaller separation distance than the coupling points 36, 38. In this way, the front end of the bonnet panel 14 can be elevated to and from the normal position when access to the engine or other components is required.

The front end of the hinge leaf 18 includes a longitudinal slot extending generally in the direction of the hinge leaf 18. This slot is not shown in the Figures due to the extent of coverage by the flange 20. The slot is co-operable with a screw 40 attached to the flange 20 so as to provide a sliding arrangement between the hinge leaf 18 and the flange 20.

The hinge leaf 18 also includes a downwardly facing nose 42. The nose 42 provides an attachment point for a bolt 44. The bolt 44 is arranged to engage the platform 26 to support the bonnet panel 14 during normal operation of the vehicle. The hinge leaf 18 also forms an attachment point 46 in the form of a pin. The attachment point 46 attaches one end of a bar 48 to the hinge leaf 18. The other end of the bar 48 is attached to the flange 20 by a second attachment point 50. The bar 48 is pivotable about the first and second attachment points 46, 50. The attachment points 46, 50 and the bar 48, together with the screw 40 being slidable within the slot (not shown), combine to form a hinge mechanism, as will be described in more detail below.

Figure 3:
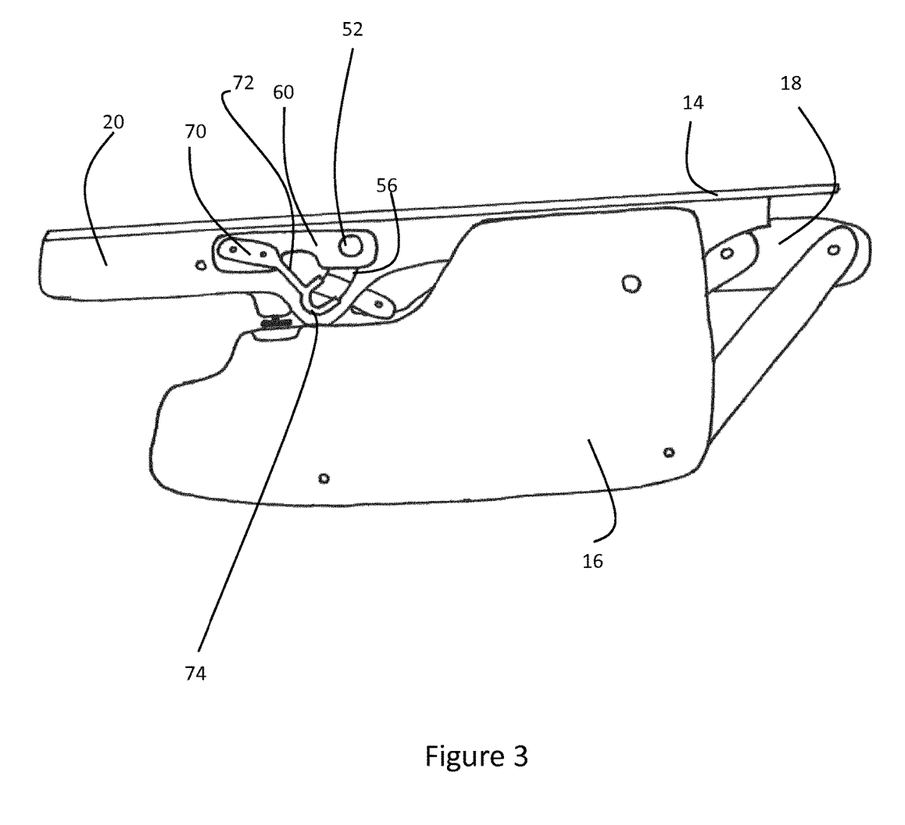
FIG. 3 shows the bonnet displacement mechanism from FIG. 2 returned to the normal position.

The hinge mechanism can elevate the rear edge 24 of the bonnet panel 14 from a normal position as shown in FIG. 1, to a deployed position, as shown in FIG. 2. In addition, the hinge mechanism can lower the rear edge 24 of the bonnet panel 14 from the deployed position as shown in FIG. 2, to a latched position as shown in FIG. 3. As will be described in more detail below, the normal position of the bonnet panel 14 is not exactly the same as the latched position of the bonnet panel 14.

The hinge leaf 18 also includes a stud 52. The stud 52 extends generally horizontally away from the hinge leaf 18.

The flange 20 forms an inverted L shape in section having a substantially vertical wall and a substantially horizontal top. The bonnet panel 14 is attached to the top. The vertical wall of the flange 20 has a downwardly projecting portion 54. This downwardly projecting portion 54 accommodates a curvilinear cut away portion in the form of a channel 56. The channel 56 forms a complementary guide for accommodating the stud 52. The stud 52 and the complementary guide control the elevating trajectory and the lowering trajectory of the bonnet panel 14. Since the stud 52 is attached to the hinge leaf 18 and the guide is provided on the flange 20, the stud 52 is movable relative to the bonnet panel 14 and the guide is stationary relative to the bonnet panel 14. When in the normal position (FIG. 1), the stud 52 abuts an upper edge of the channel 56. When in a deployed position (FIG. 2), the stud 52 abuts a lower edge of the channel 56.

A shear pin 58 attaches the hinge leaf 18 to the flange 20 when the bonnet panel 14 is at the normal position. The shear pin 58 is configured in terms of material composition and dimensions to shear at a predetermined separation force. The predetermined separation force is dictated by the force exerted on the bonnet panel 14 by the actuator 22 as described in further detail below. Once the shear pin 58 has failed, the pin 58 is separated into two parts.

The bonnet displacement mechanism 12 also includes a latch mechanism. The latch mechanism includes an elongate resilient arm 60. The resilient arm 60 is metallic. The resilient arm 60 is made from steel. The resilient arm 60 is connected to the vertical wall of the flange 20 by the second attachment point 50 and a stabilizing point 62. The stabilizing point 62 is in the form of a bolt or screw. The resilient arm 60 also has at its other end, an interior edge defining an opening 64 (FIG. 2). The opening 64 is dimensioned so as to engage the stud 52 when aligned therewith. In this way, the opening 64 can provide a catch and the stud 52 can form a complementary latch where the resilient arm 60 secures the stud 52 when the stud 52 is aligned with the opening 64. The stud 52 is aligned with the opening 64 and caught thereby when at the latched position but not at the normal position since the stud 52 and opening 64 are not aligned at the normal position.

Still with reference to FIGS. 1 and 2, the bonnet displacement mechanism 12 also includes a deformable member in the form of a strut 70. The strut 70 is connected at one end to the vertical wall of the flange 20 by the same connection point as the resilient arm 60. Namely, the second attachment point 50 and the stabilizing point 62. In this way, the strut 70 is cantilevered from the flange 20. The strut 70 forms a deformable member since it has a weakened area 72 in the form of a throat at the middle, which is relatively narrow compared to the point of connection to the flange. This throat is dimensioned to deform at a predetermined tensile load. At a suspended end of the strut 70, opposite the connection points 50, 62, the strut 70 has two upstanding legs forming a substantially U-shaped seat 74. The substantially U-shaped seat 74 is dimensioned and configured so as to receive the stud 52. The strut 70 is made from a single piece of pressed metal. In this way, the strut 70 is plastically deformable. Specifically, the strut 70 is deformable when the hinge mechanism is moved from the normal position (FIG. 1) to the deployed position (FIG. 2). At the normal position (FIG. 1) the throat is straight and at the deployed position (FIG. 2) the throat is bent forming an elbow. In this way, a simple visual inspection can determine whether or not the deformable member has deformed.

The stud 52 is the component which deforms the strut 70. This is because the stud 52 is connected to the hinge leaf 18 and moves relative to the flange 20 and so exerts a force on the seat 74 of the deformable member during relative travel of the stud 52. Since the stud 52 is in direct contact with the U-shaped seat 74 when in the normal position (FIG. 1), the strut 70 is arranged to deform over the full length of travel of the bonnet panel 14 from the normal position (FIG. 1) to the deployed position (FIG. 2).

The resilient arm 60 includes an arch 61 on its lower edge and is substantially parallel with the vertical wall of the flange 20. In addition, the resilient arm 60 is bent away from the flange 20. In this way, the resilient arm 60 allows the deformable member to pass intermediate the resilient arm 60 and the flange 20 at its suspended end. In this way, the U-shaped seat contacts the stud 52 in the normal position.

In the normal position, the stud 52 is not aligned with the opening 64. Instead, the stud 52 is in contact with the resilient arm 60 to deflect the suspended end of the arm 60 away from the flange 20 from a neutral position to a deflected position. The opening 64 thus does not form a catch to catch the stud 52 at the normal position of the bonnet panel 14.

The resilient arm 60 returns to the neutral position when the stud 52 has moved far enough down the channel 56 and is no longer in contact with the arm 60. The stud 52 deflects the resilient arm from the neutral position to the deflected position when contact re-occurs when moving the bonnet panel 14 from the deployed position (FIG. 2) to a latched position (FIG. 3). The latched position will be described in more detail below.

The actuator 22 is a pyrotechnic actuator. The pyrotechnic actuator 22 is connected to the mounting leaf 16. The pyrotechnic actuator 22 has a piston 80 at its vertical end and a control box 82 at the lower end. The piston 80 is positioned directly beneath the bonnet panel 14. The control box 82 is connected to a sensor by a wire 84. The sensor is in the form of an optical fiber pressure sensor arranged at a front end of the vehicle in order to detect pressure impulses indicative of the vehicle's impact with a pedestrian. The actuator 22 and the sensor (not shown) are known in the art and are described in no further detail here.

Operation of the bonnet displacement mechanism 12 is best described with reference to FIGS. 1 to 3. FIG. 1 shows the bonnet displacement mechanism 12 in a normal position, in use. FIG. 2 shows the bonnet displacement mechanism 12 in a deployed position. FIG. 3 shows the bonnet displacement mechanism 12 in a latched position after deployment.

With reference to FIG. 1, upon the sensor (not shown) detecting an impulse indicative of a pedestrian strike, the control box 82 sends an ignition signal to the actuator 22 to fire the piston 80. The piston 80 engages the bonnet panel 14 exerting an upward force at the rear edge 24 thereof. The hinge mechanism controls the trajectory of the bonnet panel 14. The bonnet panel 14 moves between the normal position and the deployed position until reaching the deployed position as shown in FIG. 2.

In response to the force exerted on the bonnet panel 14 by the actuator 22 firing, the shear pin 58 fails. The flange 20 and the hinge leaf 18 are thus separated. The stud 52 travels from the upper end to the lower end of the channel 56.

As the stud 52 moves down the channel 56, the weakened area 72 of the strut 70 plastically deforms as shown in FIG. 2. The bonnet panel 14 comes to rest at the deployed position when the stud 52 reaches the lower end of the channel 56. During transit, the stud 52 releases the resilient arm 60 and allows it to return to the neutral position.

With reference to FIG. 3, after deployment, the bonnet panel 14 can be moved to the latched position. This can be done by pressing down the rear edge 24 of the bonnet panel 14. In doing so the stud 52 travels back up the channel 56 to the upper end thereof. The strut 70 does not return together with the stud 52 since it has plastically deformed and remains in the deployed position. When the stud 52 reaches the upper part of the channel 56, the stud 52 deforms the resilient arm 60 so as to capture the stud 52 within the opening.

At this point, it will be appreciated that the latch mechanism does not latch the hinge mechanism at the normal position prior to elevation since this is achieved by the shear pin 58. The latch mechanism does however latch the hinge mechanism at the latched position in response to moving the hinge mechanism from the deployed position back to the latched position.

The position of the bonnet panel 14 at the normal position is not exactly the same as the position of the bonnet panel 14 at the latched position. This is because the stud 52 is misaligned from the opening 64 when at the normal position since the shear pin 58 holds the hinge leaf 18 and the flange 20 apart by a few millimeters. In this way, the bonnet panel 14 is a few millimeters lower in the latched position than in the normal position. The differences in aesthetics resulting from these arrangements signify to a user that the bonnet displacement mechanism will require attention in future. However, since there are only a few millimeters between the normal and latched positions, both positions are considered drivable positions.

The latch mechanism is advantageous since it allows for a user to reconfigure the bonnet displacement mechanism to a drivable position, after an impact. This is in contrast to the prior art where after an impact the vehicle had to be taken to a service center in order to re-latch the displacement mechanism.

Various alternative embodiments are envisaged without departing from the scope of the claims. In particular, various modifications may be made to components such as the deformable member. Some of those alternatives will now be described. However, not all of features common with the aforementioned embodiment will be replicated below for brevity.

Figure 4:
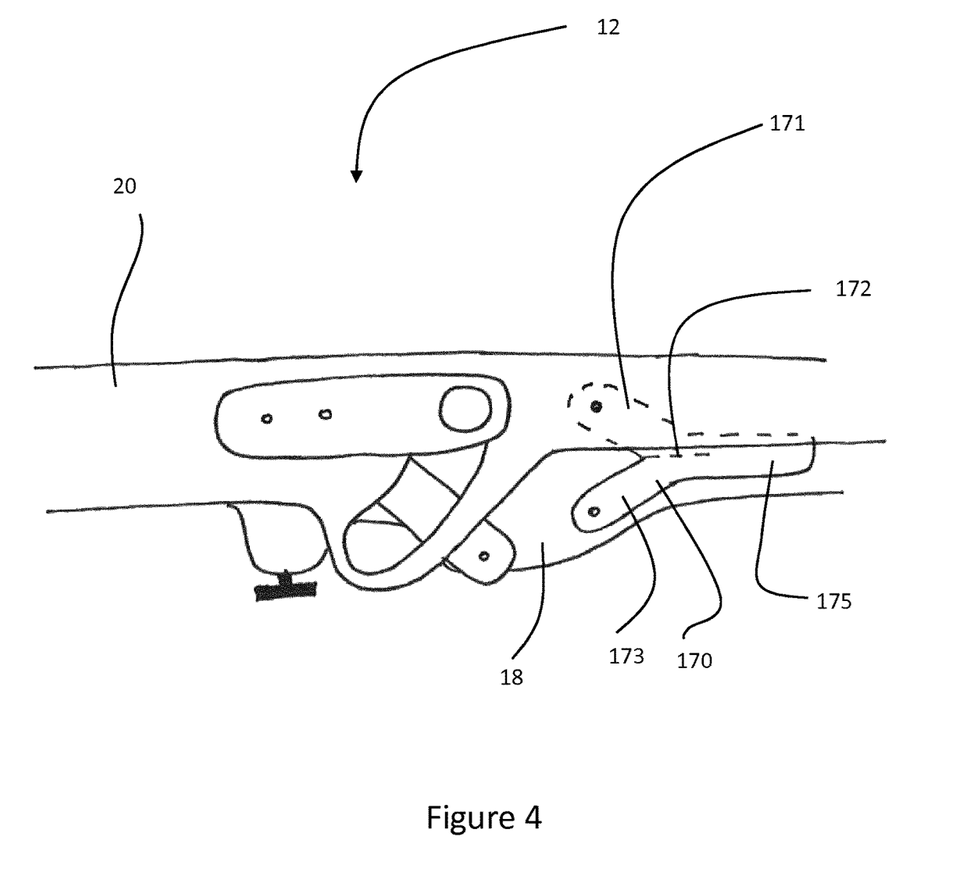
FIG. 4 shows a partial side view of an alternative embodiment of the bonnet displacement mechanism from FIG. 1.

With reference to FIG. 4, the deformable member may include a strut 170 coupled between the flange 20 and the hinge leaf 18. The strut 170 is substantially V-shaped having upper 171 and lower 173 diagonal arms. The upper arm 171 is connected to the flange 20. The lower arm 173 is connected to the hinge leaf 18. The weakened area 172 of the strut 170 is in the form of a tear between the upper and lower arms 171 and 173. When the bonnet displacement mechanism 12 deploys, the bonnet panel 14 moves from the normal position to the deployed position, the upper and lower arms 171, 173 separate along the tear line. In this way, the weakened 172 controls the deformation of the strut 170. The strut 170 also has a tail 175 making the strut form more of a Y-shape than a V-shape. This tail 175 is optional and is provided to allow for an increased length of tear between the upper and lower arms 171, 173. The length of the tear is dictated by the tensile force which the strut 170 is designed to fracture at. The tensile force is defined by the upward force exerted by the actuator 22. The strut 170 is metallic and so any deformation is plastic deformation.

Figure 5:
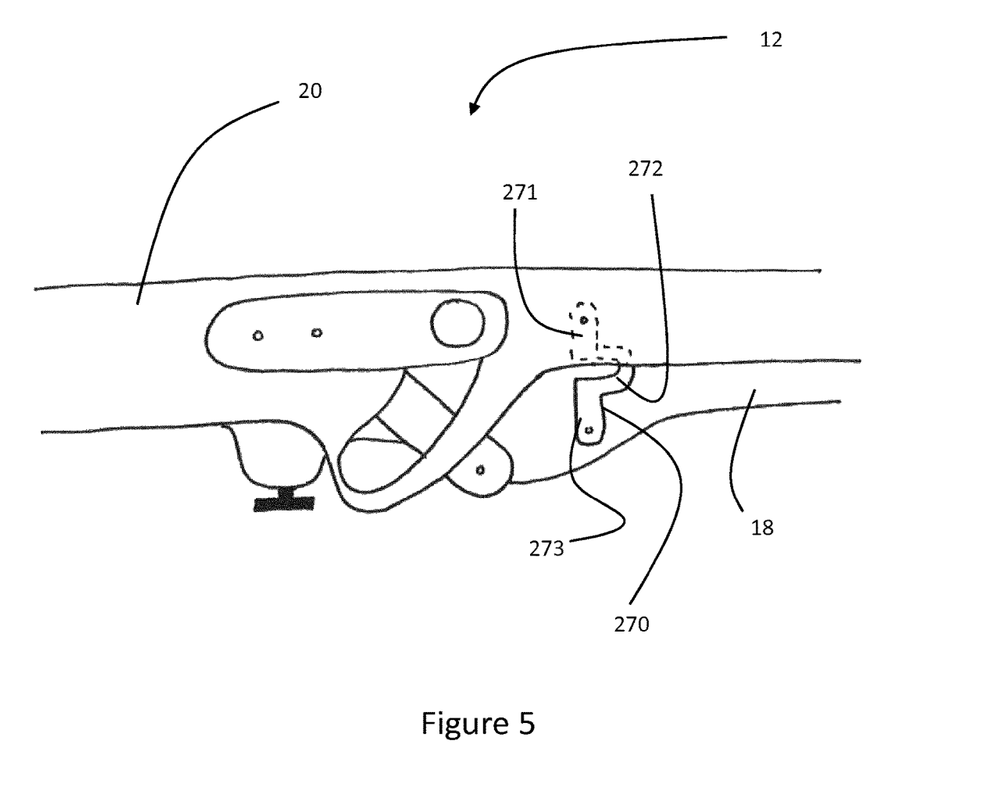
FIG. 5 shows a similar view to FIG. 4 of an alternative embodiment of the bonnet displacement mechanism.

With reference to FIG. 5, a further embodiment describes the strut 270 in the form of an elongate rod having a weakened area 272 in the form of a kink. The kink is centrally arranged between opposing upper and lower arms 271, 273 of the strut 270. The opposing arms 271, 273 of the strut 270 are connected to the flange 20 and the hinge leaf 18. Upon deployment of the bonnet displacement mechanism 12, the weakened area 272 of the strut 270 deforms at the predetermined tensile force defined by the upward force exerted by the pyrotechnic actuator 22. The strut 270 is metallic and so any deformation is plastic deformation.

Figure 6:
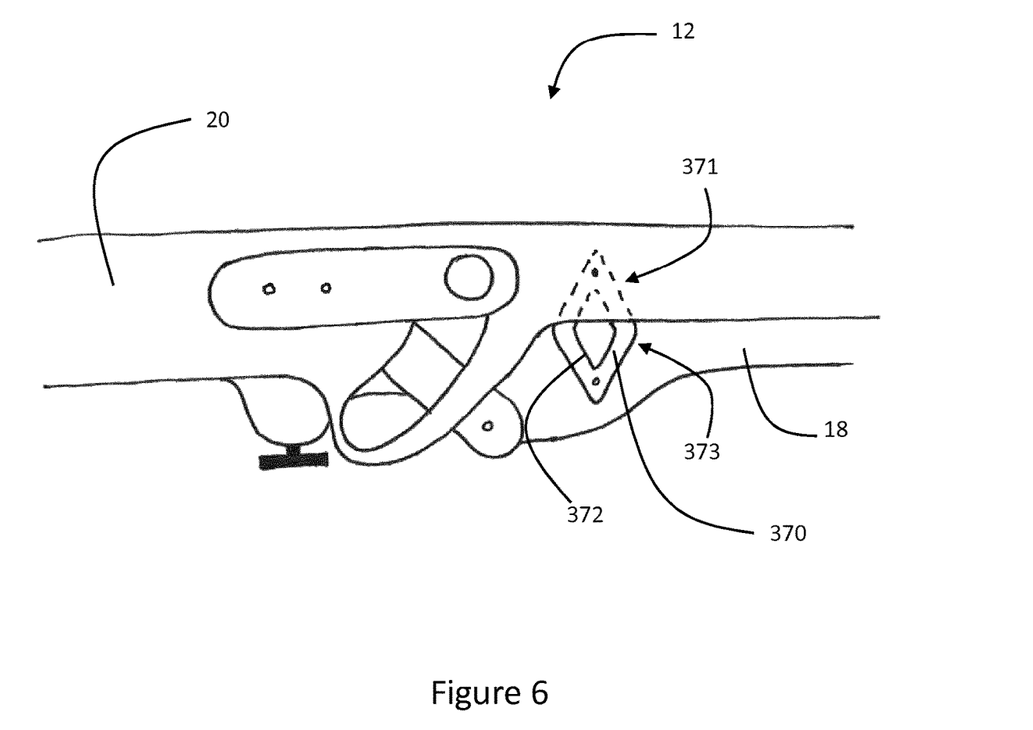
FIG. 6 shows a similar view to FIG. 5 of an alternative embodiment of the bonnet displacement mechanism.

With reference to FIG. 6, an alternative embodiment describes the strut 370 as a substantially diamond shaped component. The diamond shaped strut 370 has a central opening forming a weakened area 372. The strut 370 is attached to both the flange 20 and the hinge leaf 18 at its upper and lower arm pairs 371, 373. When the bonnet displacement mechanism 12 is deployed, the diamond shaped strut 370 collapses so as to increase in length between its opposing attachment ends. In this way, the strut 370 is plastically deformable to provide resistance to the tense load exerted by the actuator. The strut 370 is metallic and so any deformation is plastic deformation.

The invention claimed is:

1. A bonnet displacement mechanism for coupling a bonnet panel to a body structure of a vehicle, the bonnet displacement mechanism comprising;
   a hinge mechanism for elevating a rear edge of the bonnet panel from a normal position, in-use, to a deployed position, and for lowering the rear edge of the bonnet panel from the deployed position to a latched position wherein the position of the bonnet panel at said normal position is different to the bonnet at said latched position;
   a stud and a complementary guide for guiding the stud to control the elevating trajectory and the lowering trajectory of the bonnet panel; and
   a latch mechanism arranged to not latch the hinge mechanism in the normal position and to latch the hinge mechanism at the latched position,
   wherein the latch mechanism comprises a catch and a latch, wherein the catch is mis-aligned with the latch when the bonnet is in the normal position and the catch is aligned with the latch when the bonnet is in the latched position and wherein the stud forms the latch and the catch is arranged to engage and secure the stud at the latched position.

2. The bonnet displacement mechanism of claim 1, wherein the latch mechanism is arranged to latch the hinge mechanism at the latched position in response to the hinge mechanism being moved from the deployed position toward the normal position.

3. The bonnet displacement mechanism of claim 2, wherein the stud is moveable relative to the bonnet panel and the guide is stationary relative to the bonnet panel.

4. The bonnet displacement mechanism of claim 1, wherein the catch comprises an arm having an interior edge defining an opening arranged to engage the stud at the latched position.

5. The bonnet displacement mechanism of claim 4, wherein the arm is resilient to allow passage of the stud from the normal position to the latched position.

6. The bonnet displacement mechanism of claim 1 including a hinge leaf for elevating and lowering a front edge of the bonnet panel to and from the normal position, in-use, the bonnet displacement mechanism comprising a flange for coupling the hinge leaf to the bonnet panel.

7. The bonnet displacement mechanism of claim 6, wherein the guide is provided on the flange to control the elevating trajectory and the lowering trajectory of the bonnet panel and the stud is provided on the hinge leaf.

8. The bonnet displacement mechanism of claim 1, comprising a shear pin arranged to shear in dependence on the bonnet panel being moved from said normal position to said deployed position.

9. The bonnet displacement mechanism of claim 8 including a hinge leaf for elevating and lowering a front edge of the bonnet panel to and from a normal position, in-use, the bonnet displacement mechanism comprising a flange for coupling the hinge leaf to the bonnet panel, wherein the shear pin is configured to hold the hinge leaf and the flange apart from their respective latched positions.

10. The bonnet displacement mechanism of claim 1 comprising a deformable member arranged to deform in response to moving the hinge mechanism from the normal position to the deployed position.

11. The bonnet displacement mechanism of claim 10 including a hinge leaf for elevating and lowering a front edge of the bonnet panel to and from a normal position, in-use, the bonnet displacement mechanism comprising a flange for coupling the hinge leaf to the bonnet panel, wherein the deformable member includes a strut coupled between the flange and the hinge leaf when the bonnet panel is in the normal position.

12. The bonnet displacement mechanism of claim 11 wherein the strut includes a weakened area arranged to fracture at a predetermined tensile load.

13. The bonnet displacement mechanism of claim 1, wherein the position of the bonnet panel at the latched position is lower than the bonnet panel at the normal position.

14. A vehicle comprising a bonnet displacement mechanism of claim 1 for coupling a bonnet panel to a body structure of the vehicle.

15. A bonnet displacement mechanism for coupling a bonnet panel to a body structure of a vehicle, comprising;
   a flange for coupling the bonnet panel to the bonnet displacement mechanism;
   a hinge mechanism for elevating the flange from a normal position to a deployed position, the hinge mechanism comprising a stud moveable relative to the bonnet panel; and
   a deformable member coupled to the flange and comprising a substantially U-shaped seat arranged to receive therein the stud such that movement of the flange from the normal position to the deployed position causes the deformable member to deform, wherein the deformable member is cantilevered from the flange away from the stud, the deformable member extending from a cantilevered portion of the deformable member to underneath the stud.

16. The bonnet displacement mechanism of claim 15, wherein the deformable member is at least one of plastically deformable or arranged to deform over the full travel of the bonnet panel from the normal position to the deployed position.

17. The bonnet displacement mechanism of claim 15, wherein the deformable member is cantilevered from the flange and wherein the substantially U-shaped seat is provided at the suspended end thereof.

18. The bonnet displacement mechanism of claim 17, wherein the deformable member includes a weakened area arranged to deform at a predetermined tensile load.

19. The bonnet displacement mechanism of claim 18, wherein the weakened area comprises a throat intermediate a point of cantilever from the flange and the substantially U-shaped seat, the throat being narrow relative to the point of cantilever.

* * * * *